Figure 1:
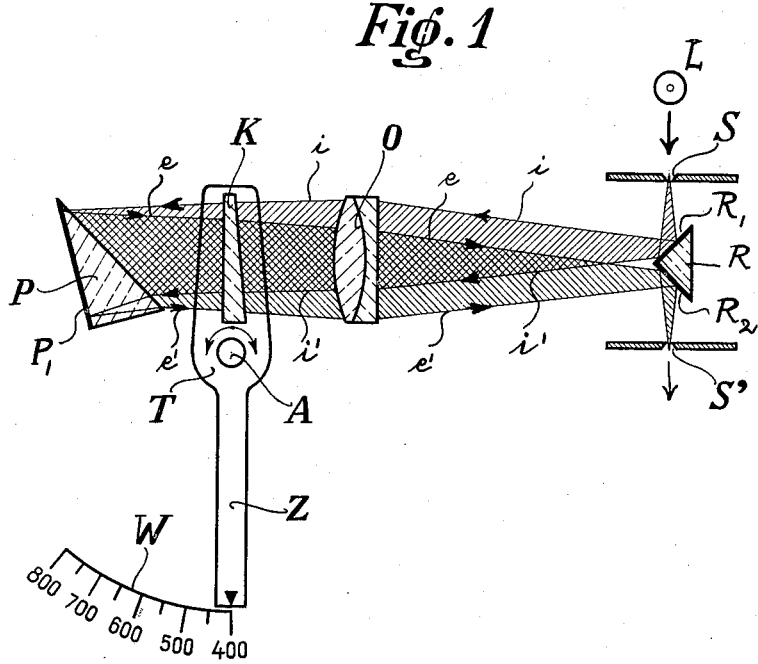

Nov. 18, 1958     W. MANDLER     2,861,172
MONOCHROMATOR
Filed Aug. 17, 1956

INVENTOR.
Walter Mandler
BY Klein & Hart
his attorneys

United States Patent Office 2,861,172
Patented Nov. 18, 1958

2,861,172

MONOCHROMATOR

Walter Mandler, Midland, Ontario, Canada, assignor to Ernst Leitz G. m. b. H., Wetzlar (Lahn), Germany, a corporation of Germany Application August 17, 1956, Serial No. 604,728

Claims priority, application Germany August 18, 1955

2 Claims. (Cl. 240—1)

The present invention relates to a monochromator, i. e. to an optical instrument with means to receive light from a suitable light source and to emit a portion of the light received, as a light ray of predetermined wavelength measured and indicated by the instrument on a scale.

In conventional instruments of that type, such adjustment is accomplished by means of a rotatable dispersing element such as a dispersing prism. However, the conventional instruments have the drawback that the angle of traverse is very small within the range of the visible spectrum of about 400 to 800 millimicrons. As a result thereof, transmission means and especially curved cams must be provided to achieve a high focusing accuracy and an approximately linear relation between rotation of the prism and wave length scale. Such regulation calls for extremely accurate construction since faulty adjustments owing to inaccuracies of the cam curves and to clearances in the bearings result in angular deflections.

It is one object of the present invention to avoid the above mentioned drawbacks of conventional instruments and to provide a monochromator wherein surprisingly high focusing accuracy is achieved by simple means.

Another object of the present invention is to provide an instrument of the above mentioned type, wherein a stationary dispersing element and at least one wedge-like glass element, rotatable within a certain compass, are arranged in the path of rays of the monochromator for adjusting the desired wave length of the ray emitted from the instrument.

A further object of the present invention consists in the use of a glass wedge as the above mentioned wedge-like glass element which glass wedge can be rotated about a pivot so as to vary deflection of the rays, whereby simultaneous transformation and correction of distortions between rotation and wave length is achieved.

Further objects and details of the invention will be apparent from the description given hereinafter and the accompanying drawing illustrating an embodiment thereof by way of example.

Figure 2:
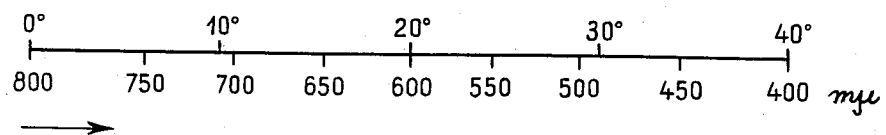

In the drawing,

Fig. 1 is a diagrammatic elevation of a monochromator according to the invention, and Fig. 2 is a diagram of the scale in Fig. 1 giving the relation between wave length and angle through which the wedge may be turned.

Referring now to the drawing in Fig. 1, a light source denoted by L emits light rays, a narrow bundle of which passes through entrance slit S. The border rays of the bundle are denoted by $i$ and $i'$, respectively. These incident rays impinge on reflecting surface $R_1$ of prism-like reflector R from where they are directed to objective O making the rays substantially parallel to each other. The parallel rays pass first through narrow glass wedge K and then through stationary dispersing prism P the rear face $P_1$ of which is coated so as to act as a mirror. Prism P is preferably positioned so that its face $P_1$ is at right angles to the incident median ray between rays $i$ and $i'$.

So arranged, the prism is in its position of minimum deflection which is the most favorable position with regard to corrections which might be necessary.

The light is dispersed by prism P, and rays $e$ and $e'$ reflected by face $P_1$ are directed towards wedge K and from there through objective O to another reflecting surface $R_2$ of reflector R from where they pass through exit slit S'. Reflecting surfaces $R_1$ and $R_2$ may be separate parts, or may form the sides of a reflector prism R as shown.

Glass wedge K is mounted on holder T pivoted at A underneath the wedge. Holder T is provided with arm Z constituting a pointer opposite stationary scale W. By a suitable selection of the angles of the prism P and wedge K and of the properties of the glass of which said prism and wedge are made, it is possible to obtain an approximately linear variability of the wave lengths for a range of e. g. 40° of the angle through which the wedge K can be swung.

As an example, in the illustrated embodiment, the prism angle of prism P is selected at 30° and the angle of wedge K is 4° 15'. The quality of the glass of which said prism and wedge are made is characterized by its specifications $n=1.62$ (refractive index) and Abbé's number$=36.3$. With the foregoing values, a 10° angle of incidence on the wedge face adjacent objective O corresponds to a wave length of $\lambda=400$ millimicrons and a 50° angle of incidence corresponds to a wave length of $\lambda=800$ millimicrons. Within this range of about 40° the wave lengths are approximately linear as shown in Fig. 2.

It will be apparent to those skilled in the art that alterations and modifications of the structure illustrated and described may be made without departure from the spirit and essence of the invention which for that reason shall not be limited but by the scope of the claims.

I claim:

1. In a monochromator, the combination of means defining an entrance slit for a beam of light rays, a stationary dispersing prism having a reflective rear face in the path of the rays coming from said entrance slit, a means defining an exit slit in the path of the rays reflected by the rear face of the dispersing prism, an objective positioned in the paths of said rays, the dispersing prism being on one side of the objective and the entrance and exit slits being on the other side thereof, said objective parallelizing the rays coming from the entrance slit and focusing the rays reflected by the rear face of the prism, a glass wedge between said objective and said prism, the objective and the glass wedge being large enough to admit the entire light beam coming to and reflected by the dispersing prism, a pivoted holder mounting said wedge for rotation about an axis perpendicular to the optical axis of the monochromator, said holder including an arm forming a fixed part of and movable with said holder and constituting a pointer, and a scale, said pointer being movable in relation to said scale.

2. In a monochromator, the combination of means defining an entrance slit for a beam of light rays, a stationary dispersing prism having a reflective rear face in the path of the rays coming from said entrance slit, the angle of the prism being 30°, a means defining an exit slit in the path of the rays reflected by the rear face of the dispersing prism, an objective positioned in the paths of said rays, the dispersing prism being on one side of the objective and the entrance and exit slits being on the other side thereof, said objective parallelizing the rays coming from the entrance slit and focusing the rays reflected by the rear face of the prism, a glass wedge between the objective and the prism, said wedge being dimensioned for an angle of 4° 15' and the glass of the prism and wedge having a refractive index of 1.62 and an Abbé's number of 36.3, the objective and glass wedge being large enough to admit the entire light beam coming to and reflected by the dispersing prism, a pivoted holder mounting said wedge for rotation about an axis perpendicular to the optical axis of the monochromator, said holder including an arm forming a fixed part of and movable with said holder and constituting a pointer, and a scale, said pointer being movable in relation to said scale.

References Cited in the file of this patent

UNITED STATES PATENTS

| | | |
|---|---|---|
| 1,682,572 | Keuffel | Aug. 28, 1928 |
| 2,612,814 | Glasser | Oct. 7, 1952 |
| 2,664,024 | Hansen | Dec. 29, 1953 |
| 2,670,652 | Sherman | Mar. 2, 1954 |
| 2,706,253 | Hutchins | Apr. 12, 1955 |

FOREIGN PATENTS

| | | |
|---|---|---|
| 604,402 | Germany | Oct. 20, 1934 |
| 903,908 | France | Feb. 5, 1945 |